United States Patent
Arora et al.

(10) Patent No.: US 6,662,362 B1
(45) Date of Patent: Dec. 9, 2003

(54) METHOD AND SYSTEM FOR IMPROVING PERFORMANCE OF APPLICATIONS THAT EMPLOY A CROSS-LANGUAGE INTERFACE

(75) Inventors: Rajiv Arora, Austin, TX (US); Robert Francis Berry, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 583 days.

(21) Appl. No.: 09/611,373

(22) Filed: Jul. 6, 2000

(51) Int. Cl.$^7$ .............................. G06F 9/45; G06F 9/44; G06F 9/00
(52) U.S. Cl. ................... 717/154; 717/131; 717/141; 709/328
(58) Field of Search ............................. 717/151–161, 717/124–141; 709/328

(56) References Cited

U.S. PATENT DOCUMENTS

| | | | | |
|---|---|---|---|---|
| 5,355,487 A | * | 10/1994 | Keller et al. ................. | 717/127 |
| 6,077,311 A | * | 6/2000 | Lichtenstein et al. ........ | 717/128 |
| 6,289,506 B1 | * | 9/2001 | Kwong et al. ............... | 717/148 |
| 6,314,558 B1 | * | 11/2001 | Angel et al. ................. | 717/118 |
| 6,484,188 B1 | * | 11/2002 | Kwong et al. ............... | 707/206 |

* cited by examiner

*Primary Examiner*—Hoang-Vu Antony Nguyen-Ba
(74) *Attorney, Agent, or Firm*—Leslie A. Van Leeuwen; Joseph R. Burwell

(57) ABSTRACT

A method, system, apparatus, and computer program product is presented for improving the execution performance of an application in a data processing system. Instrumentation code is inserted into an application in which the instrumentation code generates trace data for method entry events and method exit events when the instrumented application is executed. The trace output data that is generated by the instrumentation code is then analyzed to detect patterns which indicate an inefficient coding construct in the application. The source code for the inefficient coding construct in the application associated with the detected pattern may be modified according to indications provided to an application developer. For example, a specific inefficient coding construct may be an inefficient use of a cross-language boundary, such as the interface between Java code and native code, in which data is inefficiently transferred across the interface through a local array in the native code. A suggested transform for efficient use of a cross-language boundary may include the use of a reference to a Java object within the native code.

18 Claims, 7 Drawing Sheets

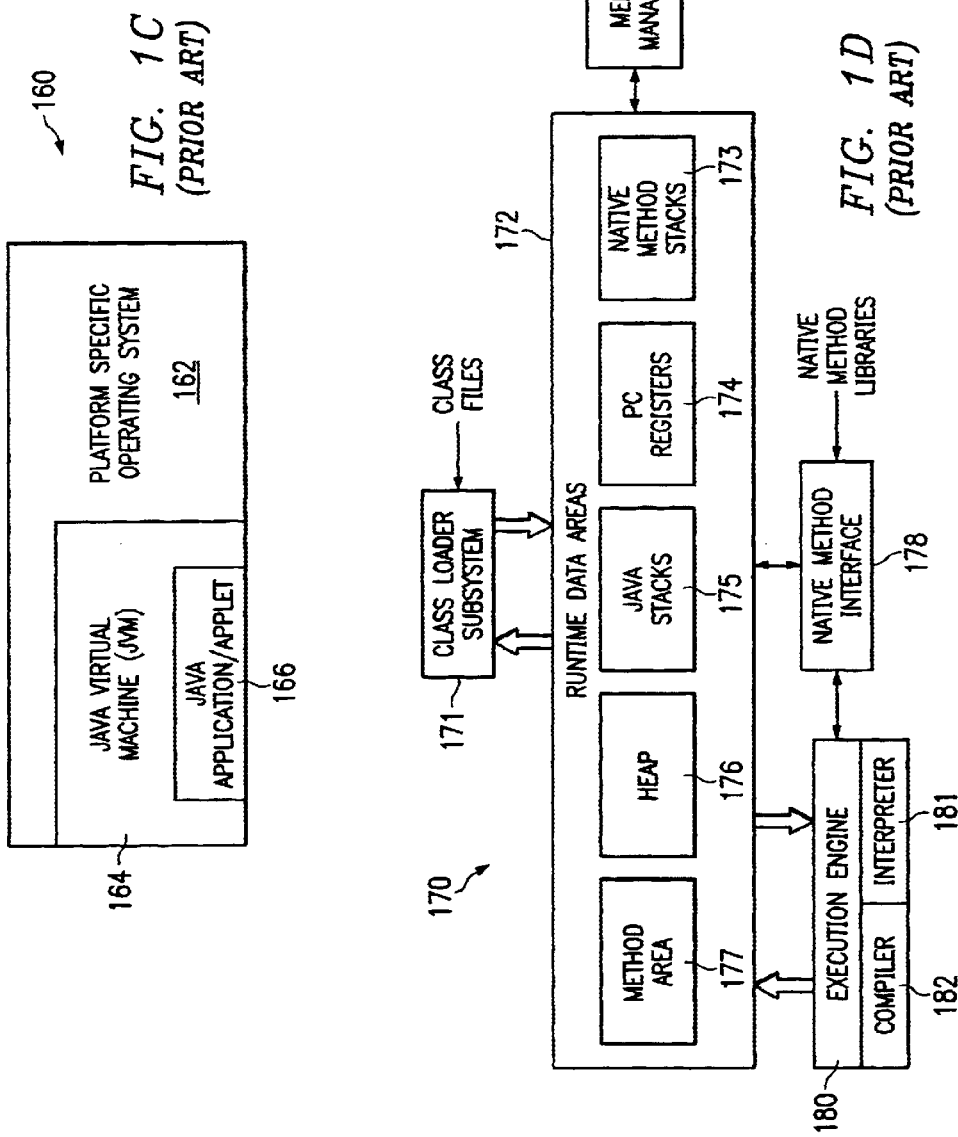

native method A ( ... ){ ... jni_getObjectField(..., obj, ...) ... } ⎯202

FIG. 2A

```
                    o
                    o
                    o
         ┌──────────────────────────┐
         │ entry: native method A   │⎯204
         │ time:  12:02:09.85743    │
         └──────────────────────────┘
                    o
                    o
                    o
         ┌──────────────────────────┐
         │ entry: jni_getObjectField│⎯206
         │ time:  12:02:09.85748    │
         └──────────────────────────┘
                    o
                    o
         ┌──────────────────────────┐
         │ exit:  jni_getObjectField│⎯208
         │ time:  12:02:09.85950    │
         └──────────────────────────┘
                    o
                    o
                    o
         ┌──────────────────────────┐
         │ exit:  native method A   │⎯210
         │ time:  12:02:09.86531    │
         └──────────────────────────┘
                    o
                    o
                    o
```

FIG. 2B native method A ( ...,jobject obj){ ... } ⎯212

FIG. 2C

```
    ⎧  native method B ( ..., jbytearray data, jint off, jint len) {
    ⎪      char localdata[MAX_ARRAY_LEN];
    ⎪              o
    ⎪              o
    ⎪       221╲   o
220 ⎨          ╲ nread = JVM_Recv( ..., localdata, len);
    ⎪       222╱ jni_SetByteArrayRegion( ..., data, off, nread, (jbyte*) localdata);
    ⎪              o
    ⎪              o
    ⎪              o
    ⎩       }
```

FIG. 2D

```
    o
    o
    o
┌─────────────────────────────┐
│ entry:  native method B     │──223
│ time:   12:02:09.85743      │
└─────────────────────────────┘
    o
    o
    o
┌─────────────────────────────┐
│ entry:  JVM_Recv            │──224
│ time:   12:02:09.85748      │
└─────────────────────────────┘
    o
    o
    o
┌─────────────────────────────┐
│ exit:   JVM_Recv            │──225
│ time:   12:02:09.85950      │
└─────────────────────────────┘
    o
    o
    o
┌─────────────────────────────┐
│ entry:  jni_SetByteArrayRegion │──226
│ time:   12:02:09.86531      │
└─────────────────────────────┘
    o
    o
    o
┌─────────────────────────────┐
│ exit:   jni_SetByteArrayRegion │──227
│ time:   12:02:09.86593      │
└─────────────────────────────┘
    o
    o
    o
┌─────────────────────────────┐
│ exit:   native method B     │──228
│ time:   12:02:09.86867      │
└─────────────────────────────┘
    o
    o
    o
```

*FIG. 2E*

```
       native method B ( ..., jbytearray data, jint off, jint len) {
           char *dataref;
              o
              o
              o
230 ┤  231── dataref = (char *) jni_GetByteArrayElements( ..., data);
       232── nread = JVM_Recv( ..., dataref+off, len);
          233── jni_ReleaseByteArrayElements( ..., data, dataref);
              o
              o
              o
       }
```

*FIG. 2F*

```
native method C ( ..., jbytearray data, jint off, jint len) {
    char localdata[MAX_ARRAY_LEN];
        o
        o
        o
241 — jni_GetByteArrayRegion( ..., data, off, nread, (jbyte *) localdata);
242 — nread = JVM_Send( ..., localdata, len);
        o
        o
        o
}
```

240 { (bracket grouping above)

FIG. 2G

```
      o
      o
      o
entry:  native method C          243
time:   12:02:09.85743
      o
      o
entry:  jni_GetByteArrayRegion    244
time:   12:02:09.85748
      o
      o
exit:   jni_GetByteArrayRegion    245
time:   12:02:09.85950
      o
      o
entry:  JVM_Send                  246
time:   12:02:09.86531
      o
      o
exit:   JVM_Send                  247
time:   12:02:09.86593
      o
      o
exit:   native method C           248
time:   12:02:09.86867
      o
      o
```

FIG. 2H

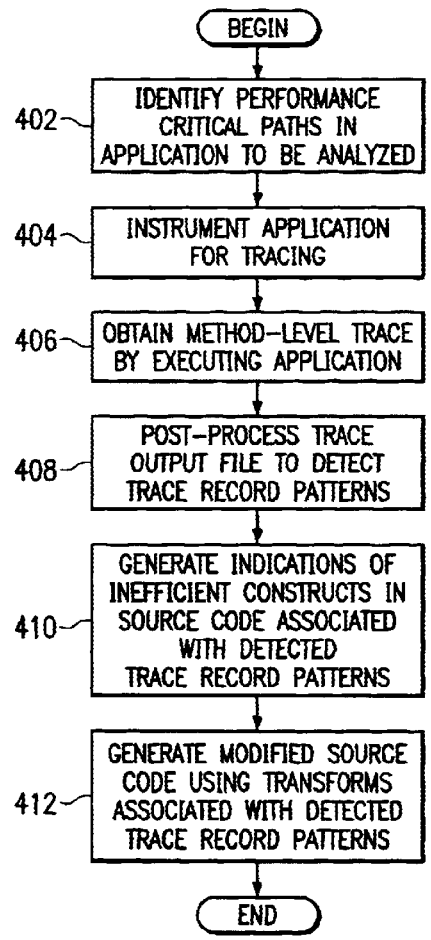

FIG. 4

METHOD AND SYSTEM FOR IMPROVING PERFORMANCE OF APPLICATIONS THAT EMPLOY A CROSS-LANGUAGE INTERFACE

BACKGROUND OF THE INVENTION

1. Field of the Invention

The present invention relates to an improved data processing system and, in particular, to a method and apparatus for optimizing performance in a data processing system. Still more particularly, the present invention provides a method and apparatus for a software program development tool for enhancing performance of a software program through software profiling.

2. Description of Related Art

Effective management and enhancement of data processing systems requires knowing how and when various system resources are being used. In analyzing and enhancing performance of a data processing system and the applications executing within the data processing system, it is helpful to know which software modules within a data processing system are using system resources. Performance tools are used to monitor and examine a data processing system to determine resource consumption as various software applications are executing within the data processing system. For example, a performance tool may identify the most frequently executed modules and instructions in a data processing system, may identify those modules which allocate the largest amount of memory, or may identify those modules which perform the most I/O requests. Hardware-based performance tools may be built into the system or added at a later point in time. Software performance tools also are useful in data processing systems, especially in personal computer systems, which typically do not contain any built-in hardware performance tools.

In order to improve performance of program code, it is often necessary to determine how time is spent by the processor in executing code, such efforts being commonly known in the computer processing arts as locating "hot spots." Ideally, one would like to isolate such hot spots at various levels of granularity in order to focus attention on code which would most benefit from improvements.

For example, isolating such hot spots to the instruction level permits compiler developers to find significant areas of suboptimal code generation at which they may thus focus their efforts to improve code generation efficiency. Another potential use of instruction level detail is to provide guidance to the designer of future systems. Such designers employ profiling tools to find characteristic code sequences and/or single instructions that require optimization for the available software for a given type of hardware.

Most software engineers are more concerned about the. efficiency of applications at higher levels of granularity, such as the source code statement level or source code module level. For example, if a software engineer can determine that a particular module requires significant amounts of time to execute, the software engineer can make an effort to increase the performance of that particular module. In addition, if a software engineer can determine that a particular module is sometimes invoked unnecessarily, then the software engineer can rewrite other portions of code to eliminate unnecessary module executions.

However, an engineer tends to analyze a system for familiar issues, and if a particular type of problem is unknown to an engineer, then some problems may remain undetected. A potential source of performance problems that tends to be overlooked by many software engineers is the cross-language interface or boundary that is present in any application or application environment that has been written using multiple languages. An application can suffer significant performance losses due to poor use of the interface. It would be helpful for software engineers to have appropriate tools to detect and remedy this particular problem by identifying inefficient, cross-language interface, coding constructs so that an application developer can transform them to more efficient constructs.

Various software performance tools are available to professional software developers. One known software performance tool is a trace tool. A trace tool may use more than one technique to provide trace information that indicates execution flows for an executing program. One technique keeps track of particular sequences of instructions by logging certain events as they occur, so-called event-based profiling technique. For example, a trace tool may log every entry and corresponding exit into and from a module, subroutine, method, function, or system component. Typically, a time-stamped record is produced for each such event. Corresponding pairs of records similar to entry-exit records may also be used to trace execution of arbitrary code segments, starting and completing I/O or data transmission, and for many other events of interest. Output from a trace tool may be analyzed in many ways to identify a variety of performance-related issues.

Therefore, it would be advantageous to provide a manner of detecting inefficient use of a cross-language interface and identifying the locations in the source code of the inefficient coding constructs so that an application developer can transform the inefficient source code to more efficient constructs. It would be particularly advantageous to provide a detection mechanism that employs the output of a well known trace tool.

SUMMARY OF THE INVENTION

The present invention is a method, system, apparatus, or computer program product for improving the execution performance of an application in a data processing system. Instrumentation code is inserted into an application in which the instrumentation code generates trace data for method entry events and method exit events when the instrumented application is executed. The trace output data that is generated by the instrumentation code is then analyzed to detect patterns which indicate an inefficient coding construct in the application. The source code for the inefficient coding construct in the application associated with the detected pattern may be modified according to indications provided to an application developer. For example, a specific inefficient coding construct may be an inefficient use of a cross-language boundary, such as the interface between Java code and native code, in which data is inefficiently transferred across the interface through a local array in the native code. A suggested transform for efficient use of a cross-language boundary may include the use of a reference to a Java object within the native code.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the-following detailed description of an illustrative embodiment when read in conjunction with the accompanying drawings, wherein:

FIG. 1C illustrates a typical relationship of software components within a computer system that supports a Java environment in which the present invention may be implemented;

FIG. 1D is a block diagram of a typical JVM;

FIGS. 2A–2C are a set of figures depicting a first example of original source code, a set of trace records representing a first pattern of trace records, and a first example of transformed source code;

FIGS. 2D–2F are a set of figures depicting a second example of original source code, a set of trace records representing a second pattern of trace records, and a second example of transformed source code;

FIGS. 2G–2I are a set of figures depicting a third example of original source code, a set of trace records representing a third pattern of trace records, and a third example of transformed source code;

FIG. 3 is a block diagram depicting examples of files and modules that may be used to implement the present invention; and FIG. 4 is a flowchart depicting the overall process of generating transformed source code with efficient cross-language interface constructs in accordance with a preferred embodiment of the present invention.

DETAILED DESCRIPTION OF THE INVENTION

Figure 1A:
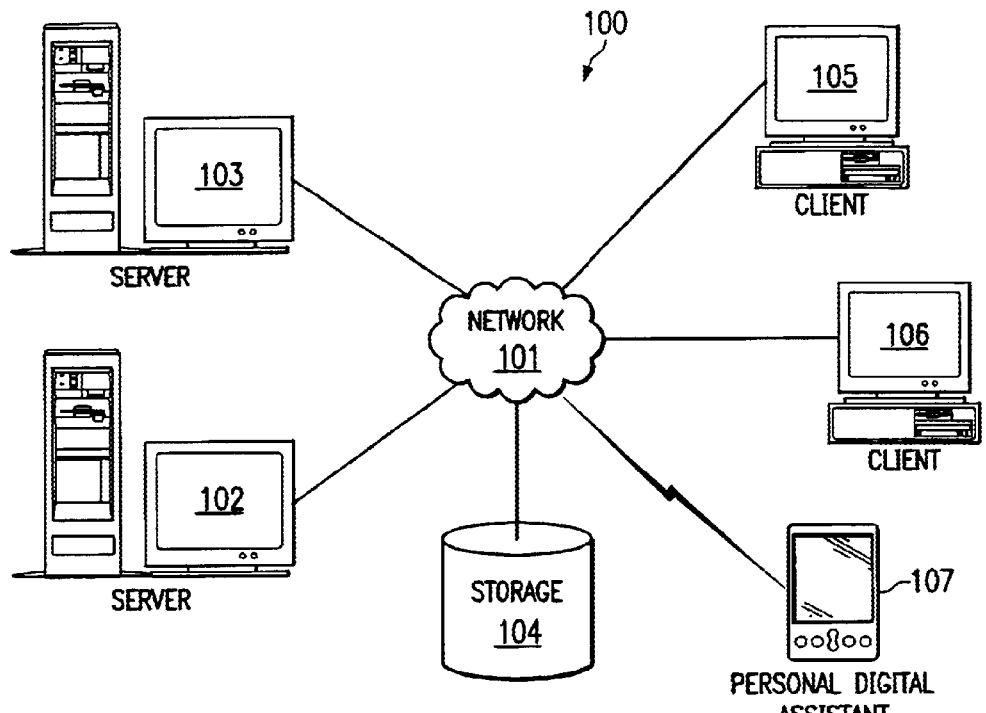
FIG. 1A depicts a typical distributed data processing system in which the present invention may be implemented.

With reference now to the figures, FIG. 1A depicts a typical distributed data processing system in which the present invention may be implemented. Distributed data processing system 100 contains network 101, which is the medium used to provide communications links between various devices and computers connected together within distributed data processing system 100. Network 101 may include permanent connections, such as wire or fiber optic cables, or temporary connections made through telephone or wireless communications. In the depicted example, server 102 and server 103 are connected to network 101 along with storage unit 104. In addition, clients 105–107 also are connected to network 101. Clients 105–107 may be a variety of computing devices, such as personal computers, personal digital assistants (PDAs), etc. Distributed data processing system 100 may include additional servers, clients, and other devices not shown. In the depicted example, distributed data processing system 100 may include the Internet with network 101 representing a worldwide collection of networks and gateways that use the TCP/IP suite of protocols to communicate with one another. Of course, distributed data processing system 100 may also be configured to include a number of different types of networks, such as, for example, an intranet, a local area network (LAN), or a wide area network (WAN). FIG. 1A is intended as an example of a heterogeneous computing environment and not as an architectural limitation for the present invention. The present invention could be implemented on a variety of hardware platforms, such as server 102 or client 107 shown in FIG. 1A.

Figure 1E:
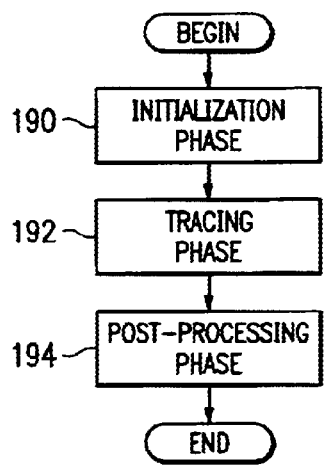
FIG. 1E is a diagram depicting various processing phases that are typically used to develop trace information.
Figure 1B:
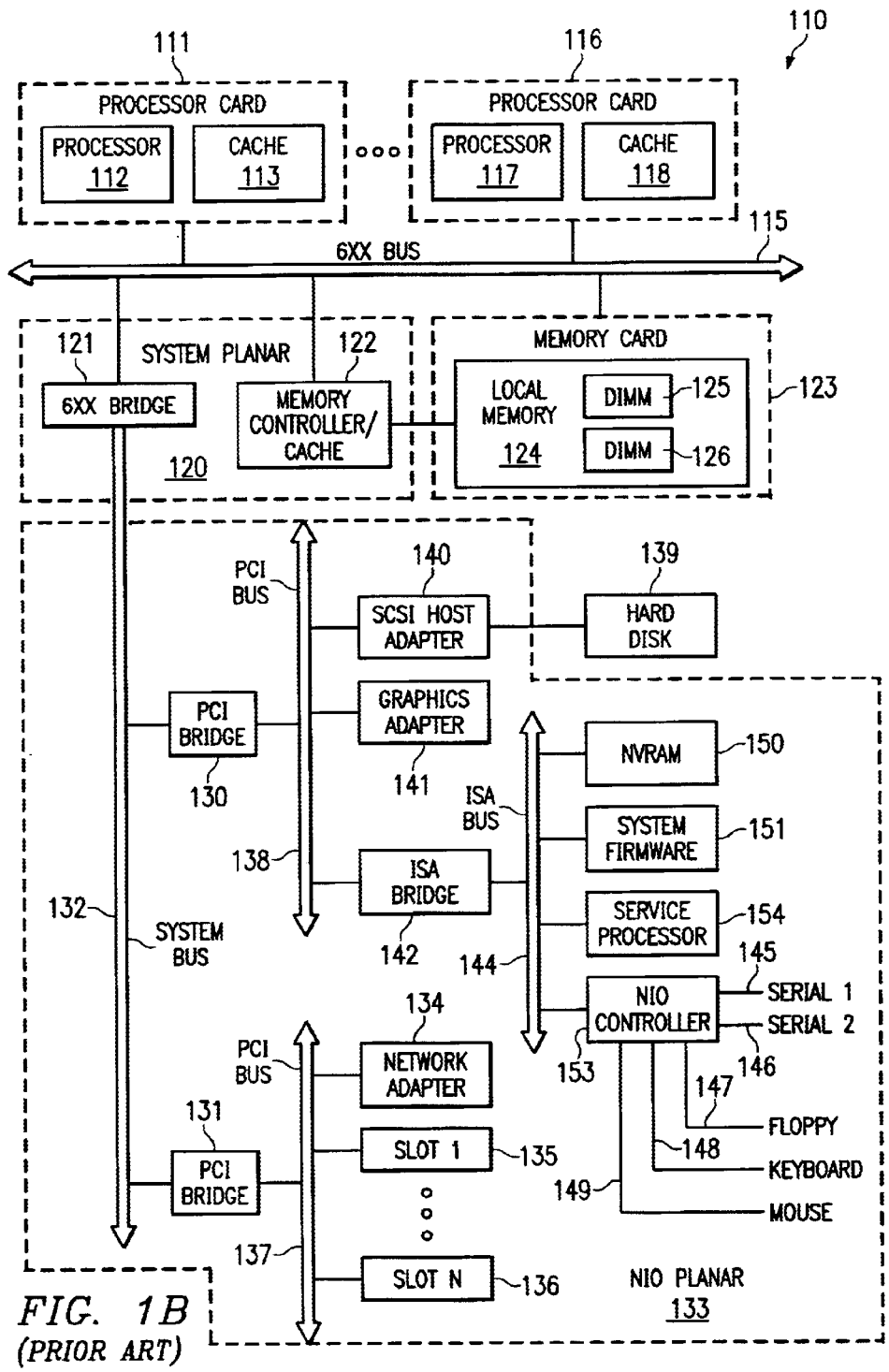
FIG. 1B depicts a typical computer architecture that may be used within a client or server in which the present invention may be implemented.

With reference now to FIG. 1B, a diagram depicts a typical computer architecture that may be used within a client or server, such as those shown in FIG. 1A, in which the present invention may be implemented. Data processing system 110 employs a variety of bus structures and protocols. Processor card 111 contains processor 112 and L2 cache 113 that are connected to 6XX bus 115. System 110 may contain a plurality of processor cards; processor card 116 contains processor 117 and L2 cache 118.

6XX bus 115 supports system planar 120 that contains 6XX bridge 121 and memory controller 122 that supports memory card 123. Memory card 123 contains local memory 124 consisting of a plurality of dual in-line memory modules (DIMMs) 125 and 126.

6XX bridge 121 connects to PCI bridges 130 and 131 via system bus 132. PCI bridges 130 and 131 are contained on native I/O (NIO) planar 133 which supports a variety of I/O components and interfaces. PCI bridge 131 provides connections for external data streams through network adapter 134 and a number of card slots 135–136 via PCI bus 137. PCI bridge 130 connects a variety of I/O devices via, PCI bus 138. Hard disk 139 may be connected to SCSI host adapter 140, which is connected to PCI bus 138. Graphics adapter 141 may also be connected to PCI bus 138 as depicted, either directly or indirectly.

ISA bridge 142 connects to PCI bridge 130 via PCI bus 138. ISA bridge 142 provides interconnection capabilities through NIO controller 153 via ISA bus 144, such as serial connections 145 and 146. Floppy drive connection 147 provides removable storage. Keyboard connection 148 and mouse connection 149 allow data processing system 110 to accept input data from a user.

Non-volatile RAM (NVRAM) 150 provides non-volatile memory for preserving certain types of data from system disruptions or system failures, such as power supply problems. System firmware 151 is also connected to ISA bus 144 and controls the initial BIOS. Service processor 154 is connected to ISA bus 144 and provides functionality for system diagnostics or system servicing.

Those of ordinary skill in the art will appreciate that the hardware in FIG. 1B may vary depending on the system implementation. For example, the system may have one or more processors, and other peripheral devices may be used in addition to or in place of the hardware depicted in FIG. 1B. The depicted examples are not meant to imply architectural limitations with respect to the present invention.

In addition to being able to be implemented on a variety of hardware platforms, the present invention may be implemented in a variety of software environments. Although the methodology of the present invention may be applied to any general software environment containing a cross-language interface or boundary, the following examples illustrate the present invention applied to the Java-C language boundary using the Java Native Interface (JNI). Hence, a general native method interface in a Java environment is hereby explained in more detail.

With reference now to FIG. 1C, a block diagram illustrates a typical relationship of software components within a computer system that supports a Java environment in which the present invention may be implemented. Java-based system 160 contains platform specific operating system 162 that provides hardware and system support to software executing on a specific hardware platform. Java Virtual Machine (JVM) 164 is one software application that may execute in conjunction with the operating system. JVM 164 provides a Java runtime environment with the ability to execute Java application or applet 166, which is a program, servlet, or software component written in the Java programming language. The computer system in which JVM 164 operates may be similar to data processing system 110 shown in FIG. 1B. However, JVM 164 may be implemented in dedicated hardware on a so-called Java chip or Java processor with an embedded JVM core.

At the center of a Java runtime environment is the JVM, which supports all aspects of Java's environment, including its architecture, security features, mobility across networks, and platform independence. The JVM is a virtual computer, i.e. a computer that is specified abstractly. The Java specifications define certain features that every JVM must implement, with some range of design choices that may depend upon the platform on which the JVM is designed to execute. For example, all JVMs must execute Java bytecodes and may use a range of techniques to execute the instructions represented by the bytecodes. A JVM may be implemented completely in software or somewhat in hardware. This flexibility allows different JVMs to be designed for a variety of hardware platforms, such as mainframe computers and PDAs.

The JVM is the name of a virtual computer component that actually executes Java programs. Java programs are not run directly by the central processor but instead by the JVM, which is itself a piece of software running on the processor. The JVM allows Java programs to be executed on a variety of platforms as opposed to only a single native platform. Java programs are compiled for the JVM. In this manner, Java is able to support applications for many types of data processing systems, which may contain a variety of central processing units and operating systems architectures.

To enable a Java application to execute on different types of data processing systems, a Java compiler typically generates an architecture-neutral file format, i.e., the Java compiler generates bytecode instructions that are nonspecific to a particular computer architecture and are executed by a Java interpreter, which is part of the JVM that alternately decodes and interprets a bytecode or bytecodes. These bytecode instructions are designed to be easy to interpret on any computer and easily translated on-the-fly into native machine code. Hence, the compiled Java code is executable on many processors, given the presence of the Java run-time system.

A JVM must load class files and execute the bytecodes within them. The JVM contains a class loader, which loads class files from an application and the class files from the Java application programming interfaces (APIs) which are needed by the application. The execution engine that executes the bytecodes may vary across platforms and implementations.

When an application is executed on a JVM that is implemented in software on a platform-specific operating system, a Java application may interact with the host operating system by invoking native methods. A Java method is written in the Java language, compiled to bytecodes, and stored in class files. A native method is written in some other language and compiled to the native machine code of a particular processor. Native methods are stored in a dynamically linked library whose exact form is platform specific.

The logical division between Java methods and native methods represents an example of a cross-language interface or boundary. The present invention is directed to improving the efficiency of an application that uses a cross-language interface or boundary, including a Java-to-native-method interface.

The abstract Java specifications state that JVM implementations are not required to support any particular native method interface, which includes the possibility of not supporting a native method interface. However, most JVMs support the Java Native Interface (JNI) specification from Sun Microsystems, Inc. JNI has been designed so that it is compatible with any JVM implementation without regard to its garbage collection methodology or its object representation methodology. However, certain JVMs may have one or more proprietary native method interfaces in place of or in addition to JNI. The present invention is applicable to any implementation of a native method interface supported by a JVM because a native method interface represents a cross-language interface or boundary. The present invention may improve the efficiency of any code that uses a native method interface.

In order to be useful, a native method should have the ability to pass information through the cross-language boundary by interacting with the internal state of the JVM. For example, the native method interface may enable native methods to retrieve and return data to data areas within the JVM. These data areas are hereby described in more detail.

With reference now to FIG. 1D, a block diagram depicts a typical JVM. JVM 170 includes a class loader subsystem 171. JVM 170 also contains runtime data areas 172, which include native method stacks 173, PC registers 174, Java stacks 175, heap 176, and method area 177. These different data areas represent the organization of memory needed by JVM 170 to execute a program.

JVM 170 also contains native method interface 178, memory management 179, and execution engine 180. Execution engine 180 is a mechanism for executing instructions contained in the methods of classes loaded by class loader subsystem 171. Execution engine 180 may include Java interpreter 181 and/or just-in-time (JIT) compiler 182. Native method interface 178 allows access to resources in the underlying operating system. For example, native method interface 178 may be a Java native interface (JNI).

Java stacks 175 are used to store the state of Java method invocations. When a new thread is launched, the JVM creates a new Java stack for the thread. The JVM performs only two operations directly on Java stacks: it pushes and pops frames. A thread's Java stack stores the state of Java method invocations for the thread. The state of a Java method invocation includes its local variables, the parameters with which it was invoked, its return value, if any, and intermediate calculations. Java stacks are composed of stack frames. A stack frame contains the state of a single Java method invocation. When a thread invokes a method, the JVM pushes a new frame onto the Java stack of the thread. When the method completes, the JVM pops the frame for that method and discards it. The JVM does not have any registers for holding intermediate values; any Java instruction that requires or produces an intermediate value uses the stack for holding the intermediate values. In this manner, the Java instruction set is well-defined for a variety of platform architectures.

Program counter (pc) registers 174 are used to indicate the next instruction to be executed. Each instantiated thread gets its own pc register and Java stack. If the thread is executing a JVM method, the value of the pc register indicates the next instruction to execute. If the thread is executing a native method, then the contents of the pc register are undefined.

Native method stacks 173 store the state of invocations of native methods. The state of native method invocations is stored in an implementation-dependent way in native method stacks, registers, or other implementation-dependent memory areas. In some JVM implementations, native method stacks 173 and Java stacks 175 are combined.

Method area 177 contains class data while heap 176 contains all instantiated objects. The JVM specification strictly defines data types and operations. Most JVMs choose to have one method area and one heap, each of which are shared by all threads running inside the JVM. When the JVM loads a class file, it parses information about a type from the binary data contained in the class file. It places this type information into the method area. Each time a class instance or array is created, the memory for the new object is allocated from heap 176. JVM 170 includes an instruction that allocates memory space within the memory for heap 176 but includes no instruction for freeing that space within the memory. Memory management 179 in the depicted example manages the JVM memory requirements, particularly the memory space within heap 176. Memory management 179 may include a garbage collector which automatically reclaims memory used by objects that are no longer referenced. Additionally, a garbage collector also may move objects to reduce heap fragmentation.

As noted above, a native method should have the ability to pass information through the cross-language boundary by interacting with the internal state of the JVM. For example, the native method interface may enable native methods to perform one or more of the following actions: access class variables or invoke class methods; access instance variables or invoke methods in objects on the heap; create new objects on the heap; indicate to the garbage collector that it no longer needs to use a particular, object, etc. The design of the native method interface can be complicated as the native method interface needs to ensure that the garbage collector does not free any objects that are being used by native methods. In addition, if a JVM implementation has a garbage collector that moves objects to reduce heap fragmentation, the native method interface must ensure that the following action may be performed: an object can be moved after its reference has been passed to a native method; and an object whose reference have been passed to a native method is pinned until the native method returns or otherwise indicates that it is finished with the object.

As noted previously, an application can suffer significant performance losses due to poor use of the cross-language interface. These types of problems may also occur in the core Java classes that also rely on JNI to communicate with native methods. The present invention is directed to a methodology of detecting and remedying poor use of a cross-language interface by identifying inefficient, cross-language, coding constructs for transformation to more efficient constructs. The present invention employs the output of a well known trace tool, analyzes the trace output, and then identifies locations within the source code at which the trace information originated. A typical trace tool or trace facility is hereby explained in more detail.

With reference now to FIG. 1E, a diagram depicts various processing phases that are typically used to develop trace information. Trace records may be produced by the execution of small pieces of code called "hooks". Hooks may be inserted in various ways into the code executed by processes, including statically (source code) and dynamically (through modification of a loaded executable). This process is employed after trace hooks have already been inserted into the process or processes of interest, i.e., after the code has been "instrumented". Instrumented code is not typically present in production quality code. In other words, because instrumentation changes the size and performance of the code to be analyzed, instrumented code is typically not delivered within a final version of an application.

An initialization phase 190 is used to capture the state of a machine at the time tracing is initiated. This trace initialization data may include trace records that identify all existing threads, all loaded classes, and all methods for the loaded classes. A record may be written to indicate when all of the startup information has been written.

Next, during the tracing phase 192, trace records are written to a trace buffer or trace file. Trace hooks may be used to record data upon the execution of the hook, which is a specialized piece of code at a specific location in a routine, module, or program. Trace hooks are typically inserted for the purpose of debugging, performance analysis, or enhancing functionality. These trace hooks may generate trace data that is stored in a trace data buffer. The trace data buffer may be subsequently stored in a file for post-processing. Trace records captured from hooks are written to indicate thread switches, interrupts, loading and unloading of classes and jitted methods, etc. Subject to memory constraints, the generated trace output may be as long and as detailed as the analyst requires for the purpose of profiling a particular program.

In the post-processing phase 194, the data collected in the trace file is-analyzed. Each trace record may be processed in a serial manner. Trace records may contain a variety of information. A trace record may identify, directly or indirectly, the thread and method that was being executed at the time that the trace record was generated; this information may be generated originally as binary identifiers that are subsequently converted to text strings. After all of the trace records are processed, the information may be formatted for output in the form of a report or may be used for other post-processing activities.

More information about tracing and trace processing may be found in the following patent applications: "PROCESS AND SYSTEM FOR MERGING TRACE DATA FOR PRIMARILY INTERPRETED METHODS", U.S. application Ser. No. 09/343,439, currently pending, filed on Jun. 30, 1999; and "METHOD AND SYSTEM FOR MERGING EVENT-BASED DATA AND SAMPLED DATA INTO POSTPROCESSED TRACE OUTPUT", U.S. application Ser. No. 09/343,438, currently pending, filed on Jun. 30, 1999.

The present invention is directed to a methodology in which inefficient cross-language boundary constructs are detected within an instrumented application during post-processing analysis of trace output generated by the instrumented application. The inefficient constructs are then identified within the source code to facilitate their transformation or replacement into more efficient constructs by an application developer or programmer.

However, before the post-processing analysis can detect the presence of these inefficient constructs in an instrumented application, the inefficient constructs must be identified beforehand so that the post-processing analysis can recognize particular patterns of information within the trace output. This identification process is an iterative, manual technique. As new inefficient constructs are discovered, corresponding efficient alternative constructs are derived. The post-processing analysis then uses this information for detecting and identifying the inefficient constructs.

For example, by analyzing method-level instruction traces of the native methods socketwrite and socketRead defined within the java.net.SocketInputstream and java.net.SocketOutputStream classes in the core Java class libraries, the following poor JNI uses have been identified:

(1) Excessive Java-native boundary crossing via the use of calls to method "jni_getObjectField". In this case, a call is made from native (C language) code in which the native method reaches back into the Java layer to get a reference to an object. This is a very expensive call, and in most cases, it is far more efficient for the Java code to pass the desired reference as an input argument to the native code.

(2) Unnecessary copying of data across the Java-native boundary. Data may be copied from a Java buffer to a native buffer instead of exploiting JNI primitives to share buffers.

From the above identified poor JNI uses, three undesirable patterns and their corresponding transforms were constructed, as shown in FIGS. 2A–2I.

With reference now to FIGS. 2A–2C, a set of figures depicts a first example of original source code, a set of trace records representing a first pattern of trace records, and a first example of transformed source code. FIG. 2A shows statement 202, which is a C-language statement for a native method that contains a call to JNI method "jni_getObjectField" within the body of the native method.

FIG. 2B shows a set of trace records within a trace output file that would be generated when an application containing native method A is instrumented with trace hooks for every method entry and method exit event. Trace record 204 is generated upon entering native method A. Trace record 206 is generated upon entering JNI method "jni_getObjectField", and trace record 208 is generated upon exiting JNI method "jni_getObjectField". Trace record 210 is then generated upon exiting native method A. Other trace records may appear in between these trace records.

During post-processing of the trace records, a trace analyzer compares the trace records that have been outputted to a trace file to known patterns of trace records. These known patterns of trace records have been previously identified in a manual process and entered into a trace pattern database. In this case, the trace analyzer detects a pattern of paired entry-exit records for a native method, within which a pair of entry-exit records for the "jni_getObjectField" method are found. The detection of this pattern causes the trace analyzer to provide some type of indication of its detection for another phase of the post-processing. At some later point in time, possibly through a different post-processing module or other software engineering tool, the location in the inefficient source code can be presented to an application developer who may use a transform associated with this particular trace pattern to modify the source code.

FIG. 2C shows statement 212, which is a C-language statement for a modified native method that is similar to the native method shown in FIG. 2A. However, the call to JNI method "jni_getObjectField" within the body of the native method, as shown in FIG. 2A, has been removed in the native method shown in FIG. 2C. Instead, FIG. 2C shows that the parameter list for the native method has been extended to include a reference to the object "obj" being sought by the call to method "jni_getObjectField". The reference to the object "obj" is passed into the native method via an additional parameter. In addition, every instance of a call to native method A would be modified to include this additional parameter.

With reference now to FIGS. 2D–2F, a set of figures depicts a second example of original source code, a set of trace records representing a second pattern of trace records, and a second example of transformed source code. FIG. 2D shows native method B 220, which is a C-language native method. Native method B 220 contains, within the body of the native method, statement 221 with a call to method "JVM_Recv" and statement 222 with a call to JNI method "jni SetByteArrayRegion". In this case, native method B is receiving data on behalf of the Java runtime code. The method "JVM_Recv" reads or receives data into a local data array "localdata". The received data is then copied, via the call to method "jni_SetByteArrayRegion", into the Java data array. Other statements could appear between statement 221 and statement 222.

FIG. 2E shows a set of trace records within a trace output file that would be generated when an application containing native method B is instrumented with trace hooks for every method entry and method exit event. Trace record 223 is generated upon entering native method B. Trace record 224 is generated upon entering method "JVM_Recv", and trace record 225 is generated upon exiting method "JVM_Recv". Trace record 226 is generated upon entering JNI method "jni_SetByteArrayRegion", and trace record 227 is generated upon exiting method "jni_SetByteArrayRegion". Trace record 228 is then generated upon exiting native method B. Other trace records may appear in between these trace records.

During post-processing of the trace records, a trace analyzer compares the trace records that have been outputted to a trace file to known patterns of trace records. These known patterns of trace records have been previously identified in a manual process and entered into a trace pattern database. In this case, the trace analyzer detects a pattern of paired entry-exit records for a native method, within which a pair of entry-exit records for the "JVM_Read" method and a following pair of entry-exit records for the "jni_SetByteArrayRegion" method are found. The detection of this pattern causes the trace analyzer to provide some type of indication of its detection for another phase of the post-processing.

FIG. 2F shows modified native method B 230, which is a C-language native method similar to the native method shown in FIG. 2D. In this case, modified native method B 230 is also receiving data on behalf of the Java runtime code in a manner similar to native method B 220 shown in FIG. 2D. However, the call to method "jni_SetByteArrayRegion" within the body of the native method, as shown in FIG. 2D, has been removed in the modified native method shown in FIG. 2F and replaced with a pair of calls to JNI methods. Modified native method B 230 contains, within the body of the native method: statement 231 with a call to method "jni_GetByteArrayElements", which obtains a local reference "dataref" to the Java data array; statement 232 with a call to method "JVM_Recv", which reads the received data directly into the data array via "dataref"; and statement 233 with a call to JNI method "jni_ReleaseByteArrayElements", which releases the local reference to the Java data array. Other statements could appear between statements 231–233.

Rather than using the method "JVM_Recv" to receive data into a local data array and then copying the received data into the Java data array, the native method has been modified in the following manner: obtain a local reference "dataref" to the Java data array; read or receive data directly into the Java data array via the local reference "dataref"; and release the local reference. In this case, every instance of a call to native method B does not need to be modified as the only required modifications are contained within the modified native method, i.e., the parameters to the native method were not changed.

Figures 2I, 3:
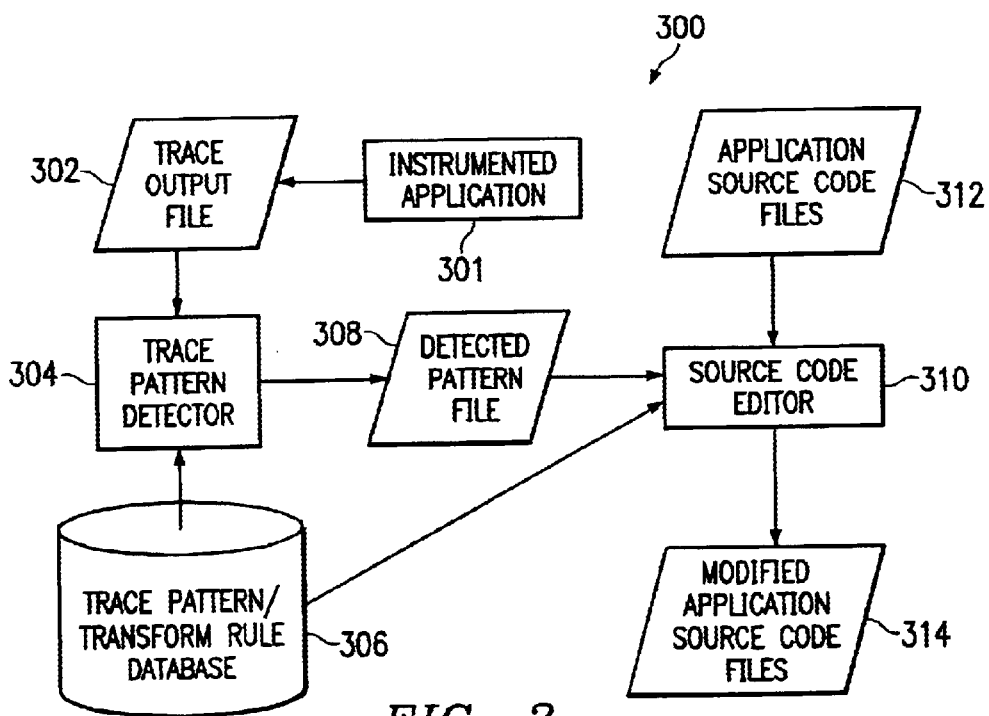

With reference now to FIGS. 2G–2I, a set of figures depicts a third example of original source code, a set of trace records representing a third pattern of trace records, and a third example of transformed source code. FIGS. 2G–2I are similar to FIGS. 2D–2F. Whereas FIGS. 2D–2F depict source code statements for receiving data into a Java data structure across a cross-language boundary, FIGS. 2G–2I depict the "reverse" situation, i.e., sending data from a Java data structure across a cross-language boundary.

FIG. 2G shows native method C 240, which is a C-language native method. Native method C 240 contains, within the body of the native method, statement 241 with a call to JNI method "jni_GetByteArrayRegion" and statement 242 with a call to method "JVM_Send". In this case, native method C is sending data on behalf of the Java runtime code. The method "jni_GetByteArrayRegion" copies data from a Java byte array into a local data array "localdata". The copied data is then sent, via the call to method "JVM Send", from the local data array. Other statements could appear between statement 241 and statement 242.

FIG. 2H shows a set of trace records within a trace output file that would be generated when an application containing native method C is instrumented with trace hooks for every method entry and method exit event. Trace record 243 is generated upon entering native method C. Trace record 244 is generated upon entering JNI method "jni_GetByteArrayRegion", and trace record 245 is generated upon exiting method "jni_GetByteArrayRegion". Trace record 246 is generated upon entering method "JVM_Send", and trace record 247 is generated upon exiting method "JVM_Send". Trace record 248 is then generated upon exiting native method C. Other trace records may appear in between these trace records.

During post-processing of the trace records, a trace analyzer compares the trace records that have been outputted to a trace file to known patterns of trace records. These known patterns of trace records have been previously identified in a manual process and entered into a trace pattern database. In this case, the trace analyzer detects a pattern of paired entry-exit records for a native method, within which a pair of entry-exit records for the "JVM_Read" method and a following pair of entry-exit records for the "jni_SetByteArrayRegion" method are found. The detection of this pattern causes the trace analyzer to provide some type of indication of its detection for another phase of the post-processing.

FIG. 2I shows modified native method C 250, which is a C-language native method similar to the native method shown in FIG. 2G. In this case, modified native method C 250 is also receiving data on behalf of the Java runtime code in a manner similar to native method C 240 shown in FIG. 2G. However, the call to method "jni_GetByteArrayRegion" within the body of the native method, as shown in FIG. 2G, has been removed in the modified native method shown in FIG. 2I and replaced with a pair of calls to JNI methods. Modified native method C 240 contains, within the body of the native method: statement 251 with a call to method "jni_GetByteArrayElements", which obtains a local reference "dataref" to the Java data array; statement 252 with a call to method "JVM_Send", which sends the data directly from the data array via "dataref"; and statement 253 with a call to JNI method "jni_ReleaseByteArrayElements", which releases the local reference to the Java data array. Other statements could appear between statements 251–253.

Rather than copying the data from the Java data array into a local data array and then using the method "JVM_Send" to send the data from the local data array, the native method has been modified in the following manner: obtain a local reference "dataref" to the Java data array; send data directly from the Java data array via the local reference "dataref"; and release the local reference. In this case, every instance of a call to native method C does not need to be modified as the only required modifications are contained within the modified native method, i.e., the parameters to the native method were not changed.

With reference now to FIG. 3, a block diagram depicts examples of files and modules that may be used to implement the present invention. The present invention may be implemented using a variety of files, databases, and configurations of post-processing tasks or applications without varying from the scope of the invention. Data processing system 300 supports instrumented application 301, which generates trace records that are written to trace output file 302 during execution. A trace record may identify, directly or indirectly, the thread and method that was being executed at the time that the trace record was generated; this information may be generated originally as binary identifiers that are subsequently converted to text strings. After all of the trace records are processed, the information may be formatted for output in the form of a report or may be used for other post-processing activities. In any case, the instrumentation code has been written so that the generated trace records allow an identification of source code locations for the modules, functions, routines, or methods that generated the outputted trace records.

Trace pattern detector 304 reads trace output file 302 and compares its patterns of trace records against the trace pattern rules stored within trace pattern/transform rule database 306. As matching patterns of trace records are found within trace output file 302, trace pattern detector 304 generates trace pattern indication records to detected pattern file 308, which stores the names of methods, modules, etc. that contain inefficient cross-language constructs.

As part of the same post-processing analysis, or at some later stage of post-processing, source code editor 310 reads application source code files 312 to present the methods, modules, etc., to an application developer. Source code editor 310 may include other computer-aided software engineering (CASE) tools, as necessary, for allowing a software engineer to develop code. In other words, an entire CASE environment may be available to a software engineer for viewing and manipulating these types of files.

Source code editor 310 also reads detected pattern file 308 that contains indications of inefficient constructs. Using the indications in detected pattern file 308 and the source code transforms and/or rules stored within trace pattern/rule database 306, a special script can be run that can parse the source code files to find the source code functions that match the functions identified in detected pattern file 308. These identified functions can be highlighted in a manner that allows the software engineer to see the inefficient construct usage. Examples of efficient coding constructs may be displayed, and the CASE tool may present the original function with suggested modifications to the software engineer in some manner, such as displaying the modified code in a separate or overlaying window.

In any case, the software engineer examines the formatted output, together with any candidate transforms, and uses source code editor 310 to modify the application source code and generate modified application source code files 314. An intelligent editing environment can be used to find all invocations of the modified function and to enable changes to be made to function invocations. Generally, manual intervention is required by the software engineer to ensure that the correct decision is made with respect to the source code. The modified source code may then be tested, debugged, etc. as necessary.

With reference now to FIG. 4, a flowchart depicts the overall process of generating transformed source code with efficient cross-language interface constructs in accordance with a preferred embodiment of the present invention. The process begins by identifying performance critical paths or execution flows in an application (step 402). The application is then instrumented for tracing (step 404), and a method-level trace is obtained by executing the instrumented application (step 406).

The trace output is then post-processed in order to detect the existence of undesirable trace record patterns (step 408), and the locations in the source code of the inefficient constructs are indicated in some manner (step 410).

At this point, an optional step may be performed to determine whether a performance benefit is obtained by generating and using transformed source code. This determination may be based upon an observation of the data sizes that are processed by the analyzed application. For example, if only small amounts of data are transferred through the cross-language boundary, then in some instances, the transformed code may actually be more inefficient than the original code. This may occur if any method calls that are inserted into the transformed code require more processing time than the time required to perform a copying action across the boundary/interface. If the transformed code is determined to be more efficient, then the transformation process would continue.

Using the source code locations derived from the trace records that indicate inefficient constructs, the original source code is located, and modified source code is then generated in some manner by a software developer for this particular type of construct (step 412), and the process is complete.

The advantages of the present invention should be apparent in view of the detailed description of the invention that is provided above. Inefficient coding constructs for a cross-language interface or boundary may be present in any application or application environment that has been written using multiple languages. An application can suffer significant performance losses due to poor use of the interface. The present invention provides a mechanism for using a trace tool to detect and remedy this particular problem by identifying inefficient, cross-language interface, coding constructs and allowing a software engineer to transform them to more efficient constructs.

It is important to note that while the present invention has been described in the context of a fully functioning data processing system, those of ordinary skill in the art will appreciate that the processes of the present invention are capable of being distributed in the form of a computer readable medium of instructions and a variety of other forms and that the present invention applies equally regardless of the particular type of signal bearing media actually used to carry out the distribution. Examples of computer readable media include media such as EPROM, ROM, tape, paper, floppy disc, hard disk drive, RAM, and CD-ROMs and transmission-type media such as digital and analog communications links.

The description of the present invention has been presented for purposes of illustration and description but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for improving the execution performance of an application in a data processing system, wherein the application contains native code and non-native code supported by a cross-language boundary having methods for interfacing native code and non-native code, the method comprising:

analyzing trace output data generated by instrumentation code in the application during the execution of the application;

detecting a call within a native method to a cross-language interface method that obtains an object reference to an object that is created by non-native code;

removing the call to the cross-language interface method from the native method;

modifying the native method to accept as an input argument an object reference to an object that is created by non-native code; and modifying calls to the native method to pass as an input argument an object reference to an object that is created by non-native code.

2. The method of claim 1, wherein the trace output data is associated with a series of method entry events and method exit events.

3. The method of claim 1 wherein the cross-language boundary has methods for interfacing between Java code and native code.

4. The method of claim 1 wherein the cross-language interface method is a Java Native Interface (JNI) method.

5. A data processing system for improving the execution performance of an application, wherein the application contains native code and Java code supported by a cross-language boundary having methods for interfacing native code and Java code, wherein the data processing system includes a central processing unit (CPU) and a memory for storing data, the data processing system comprising:

means for analyzing trace output data generated by instrumentation code in the application during the execution of the application;

means for detecting a call within a native method to a cross-language interface method that obtains an object reference to an object that is created by non-native code;

means for removing the call to the cross-language interface method from the native method;

means for modifying the native method to accept as an input argument an object reference to an object that is created by non-native code; and means for modifying calls to the native method to pass as an input argument an object reference to an object that is created by non-native code.

6. The data processing system of claim 5 wherein the trace output data is associated with a series of method entry events and method exit events.

7. The data processing system of claim 5 wherein the cross-language boundary has methods for interfacing between Java code and native code.

8. The data processing system of claim 5 wherein the cross-language interface method is a Java Native Interface (JNI) method.

9. A computer program product in a computer-readable medium for use in a data processing system for improving the execution performance of an application, wherein the application contains native code and Java code supported by a cross-language boundary having methods for interfacing native code and Java code, the computer program product comprising:

instructions for analyzing trace output data generated by instrumentation code in the application during the execution of the application;

instructions for detecting a call within a native method to a cross-language interface method that obtains an object reference to an object that is created by non-native code;

instructions for removing the call to the cross-language interface method from the native method;

instructions for modifying the native method to accept as an input argument an object reference to an object that is created by non-native code; and instructions for modifying calls to the native method to pass as an input argument an object reference to an object that is created by non-native code.

10. The computer program product of claim 9 wherein the trace output data is associated with a series of method entry events and method exit events.

11. The computer program product of claim 9 wherein the cross-language boundary has methods for interfacing between Java code and native code.

12. The computer program product of claim 9 wherein the cross-language interface method is a Java Native Interface (JNI) method.

13. A method for improving the execution performance of an application in a data processing system, wherein the application contains native code and non-native code supported by a cross-language boundary having methods for interfacing native code and non-native code, the method comprising:

analyzing trace output data generated by instrumentation code in the application during the execution of the application;

detecting a native method that reads or writes data using calls to cross-language interface methods that copy data between a non-native buffer that is created by non-native code and a native buffer that is created by native code;

in response to detecting calls to cross-language interface methods that copy data between a non-native buffer and a native buffer, modifying the native method to obtain a reference to a non-native buffer using a cross-language interface method;

modifying the native method to read or write data using a cross-language interface method that uses the reference to the non-native buffer; and modifying the native method to release the reference to the non-native buffer using a cross-language interface method.

14. The method of claim 13 wherein the cross-language boundary has methods for interfacing between Java code and native code.

15. A data processing system for improving the execution performance of an application, wherein the application contains native code and Java code supported by a cross-language boundary having methods for interfacing native code and Java code, wherein the data processing system includes a central processing unit (CPU) and a memory for storing data, the data processing system comprising:

means for analyzing trace output data generated by instrumentation code in the application during the execution of the application;

means for detecting a native method that reads or writes data using calls to cross-language interface methods that copy data between a non-native buffer that is created by non-native code and a native buffer that is created by native code;

means for modifying, in response to detecting calls to cross-language interface methods that copy data between a non-native buffer and a native buffer, the native method to obtain a reference to a non-native buffer using a cross-language interface method;

means for modifying the native method to read or write data using a cross-language interface method that uses the obtained reference to the non-native buffer; and means for modifying the native method to release the obtained reference to the non-native buffer using a cross-language interface method.

16. The data processing system of claim 15 wherein the cross-language boundary has methods for interfacing between Java code and native code.

17. A computer program product in a computer-readable medium for use in a data processing system for improving the execution performance of an application, wherein the application contains native code and Java code supported by a cross-language boundary having methods for interfacing native code and Java code, the computer program product comprising:

instructions for analyzing trace output data generated by instrumentation code in the application during the execution of the application;

instructions for detecting a native method that reads or writes data using calls to cross-language interface methods that copy data between a non-native buffer that is created by non-native code and a native buffer that is created by native code;

instructions for modifying, in response to detecting calls to cross-language interface methods that copy data between a non-native buffer and a native buffer, the native method to obtain a reference to a non-native buffer using a cross-language interface method;

instructions for modifying the native method to read or write data using a cross-language interface method that uses the obtained reference to the non-native buffer; and instructions for modifying the native method to release the obtained reference to the non-native buffer using a cross-language interface method.

18. The computer program product of claim 17 wherein the cross-language boundary has methods for interfacing between Java code and native code.

* * * * *